Jan. 30, 1962 J. PERROCHAT 3,018,529
MOLDING FASTENER
Filed May 28, 1958

INVENTOR:
JEAN PERROCHAT,
BY Walter S. Jones
ATTORNEY.

United States Patent Office 3,018,529
Patented Jan. 30, 1962

3,018,529
MOLDING FASTENER
Jean Perrochat, Basel, Switzerland, assignor to
A. Raymond, Grenoble, France, a firm
Filed May 28, 1958, Ser. No. 738,477
Claims priority, application Switzerland May 29, 1957
1 Claim. (Cl. 24—73)

This invention relates to fastening devices and in particular to a molding device for attaching hollow trim molding or the like to a panel.

In the construction of automobile appliances and the like, channelled decorative molding is required to be attached to the exterior surface of certain panels. According to this invention, the fastener, which consists of an elastic plastic material, has a recess originating from the fastening element for the molding strip and extending to a plug provided with a constricted area which is used for the insertion of a tool to insert the plug into an apertured panel by simple means, for example, a wooden rod. The application of the attaching tool into the recess of the fastener elongates the plug so that it reduces its cross-sectional area and can easily be inserted into the panel. When the exterior plate of the fastener makes contact with the panel, the application tool can be withdrawn so that the fastener, due to its resilient characteristics returns to its original shape so that the constriction engages the edges of the panel aperture.

The object of this invention is to provide a fastening device which has improved means for engagement into a panel opening.

Another object of this invention is to provide a fastening device which, due to the resilient characteristics of the material involved, will effectively seal a panel opening.

Other objects of this invention will, in part, be obvious, and will, in part, appear hereinafter.

Figure 1:
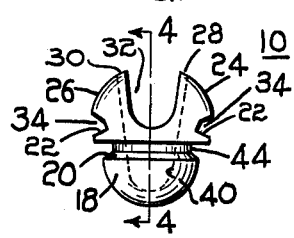
FIG. 1 is a view in front elevation of the fastening device embodying the features of the invention.
Figure 2:
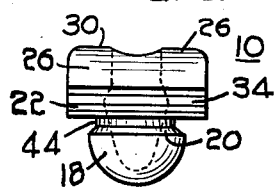
FIG. 2 is a side elevation as viewed from the left of FIG. 1.
Figure 3:
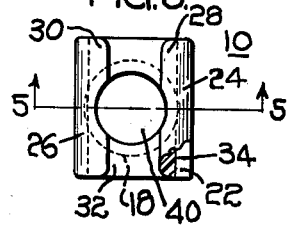
FIG. 3 is a top plan view of the fastener.
Figure 4:
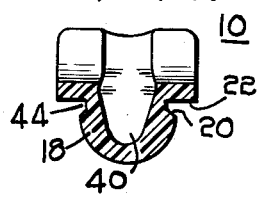
FIG. 4 is a view taken on line 4—4 of FIG. 1.
Figure 5:
FIG. 5 is a view taken on line 5—5 of FIG. 3.

Referring to the drawing there is illustrated a fastening device 10 which is adapted for assembly into an opening 12 in a panel 14 to enable a trim molding 16 or the like to be attached thereto.

Figure 6:
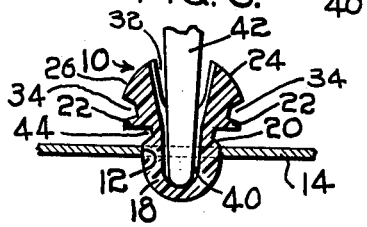
FIG. 6 is a view similar to FIG. 5 showing the fastener having the application tool in engagement.
Figure 7:
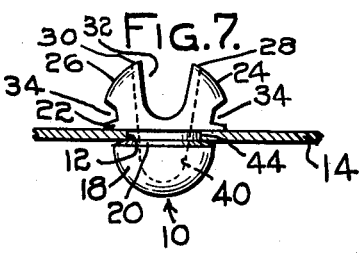
FIG. 7 is a view similar to FIG. 1 showing the fastener in assembly in the panel.
Figure 8:
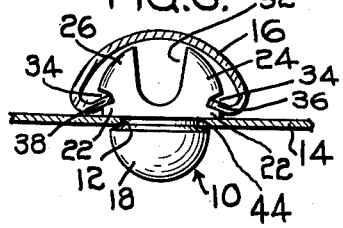
FIG. 8 is a view similar to FIG. 7 showing the fastener in assembly in the panel with the molding strip attached thereto.

The fastener 10 consists of a plug 18 which is hemipherical in shape extending upward into a neck shaped portion 20 forming a constriction. On the neck shaped part 20 is formed an outwardly extending flange 22 having upwardly extending flanges 24 and 26 at opposite edges thereof for receiving a panel molding 16. The upwardly extending flanges 24 and 26 have the terminal end portions 28 and 30 rounded and are spaced from each other to provide a bifurcation 32 between the flanges to allow them to flex inwardly toward each other during the application of the panelled molding. Grooves 34—34 are disposed intermediate the flange 22 and the upwardly extending flanges 24 and 26 to provide means for frictionally engaging the elbow portions 36 and 38 of the trim molding. A recess 40 extending downwardly from the bifurcation 32 into the interior of the molding fastener extends into the hemispherical plug 18. In FIG. 6 there is illustrated the application of the fastener 10 to the panel 14 by means of an attaching tool 42 as shown, the tool 42 is inserted into the top of the recess 40 and extends to the bottom thereof so that downward pressure applied to the tool will cause the plug 18 to expand longitudinally and diminish the cross-sectional area to such an extent that it will pass through the opening 12 in the panel 14. The plug 18, after passing through the panel, allows the flange 22 to contact the upper surface of the panel 14 so that the rim of the opening 12 will be engaged by the circumferential groove 44 so that the clamp is now firmly mounted on the panel. The final step in the assembly is shown in FIG. 8 where the hollow molding 16 is snapped over the molding fastener so that the elbow portions 36 and 38 will frictionally engage in the recesses 34—34.

Since certain other obvious modifications may be made in this device without departing from the scope of the invention, it is intended that all matters contained herein be interpreted in an illustrative and not in a limiting sense.

I claim:

A fastener for molding trim and like installations, said fastener being in itself a complete device for holding a molding in place on a support free of any other elements and being formed only as a single piece of elastic molded plastic material, said fastener having a support engaging stud portion, adjacent to one end, provided with a preformed yieldable head and a neck to hold the fastener in position relative to a support, a bifurcated, yieldable molding engaging flanged means portion located adjacent to an opposite end of the fastener, said molding engaging flanged means portion having yieldable flanges provided with external groove means formed therein for receiving portions of a molding and said yieldable flanges cooperating with said external groove means for snapping into engagement with and holding the molding in place, and said fastener being shaped and arranged to provide moisture-tight sealing means when engaged with a support.

References Cited in the file of this patent

UNITED STATES PATENTS

| 204,913 | Pratt | June 18, 1878 |
| 1,830,460 | Berge | Nov. 3, 1931 |
| 2,585,438 | Clingman | Feb. 12, 1952 |
| 2,709,290 | Rosenthal | May 31, 1955 |
| 2,759,390 | Edwards | Aug. 21, 1956 |
| 2,780,128 | Rapata | Feb. 5, 1957 |